Oct. 16, 1923.
J. L. CREVELING
POWER TRANSMISSION
Filed Oct. 26, 1914
1,470,961
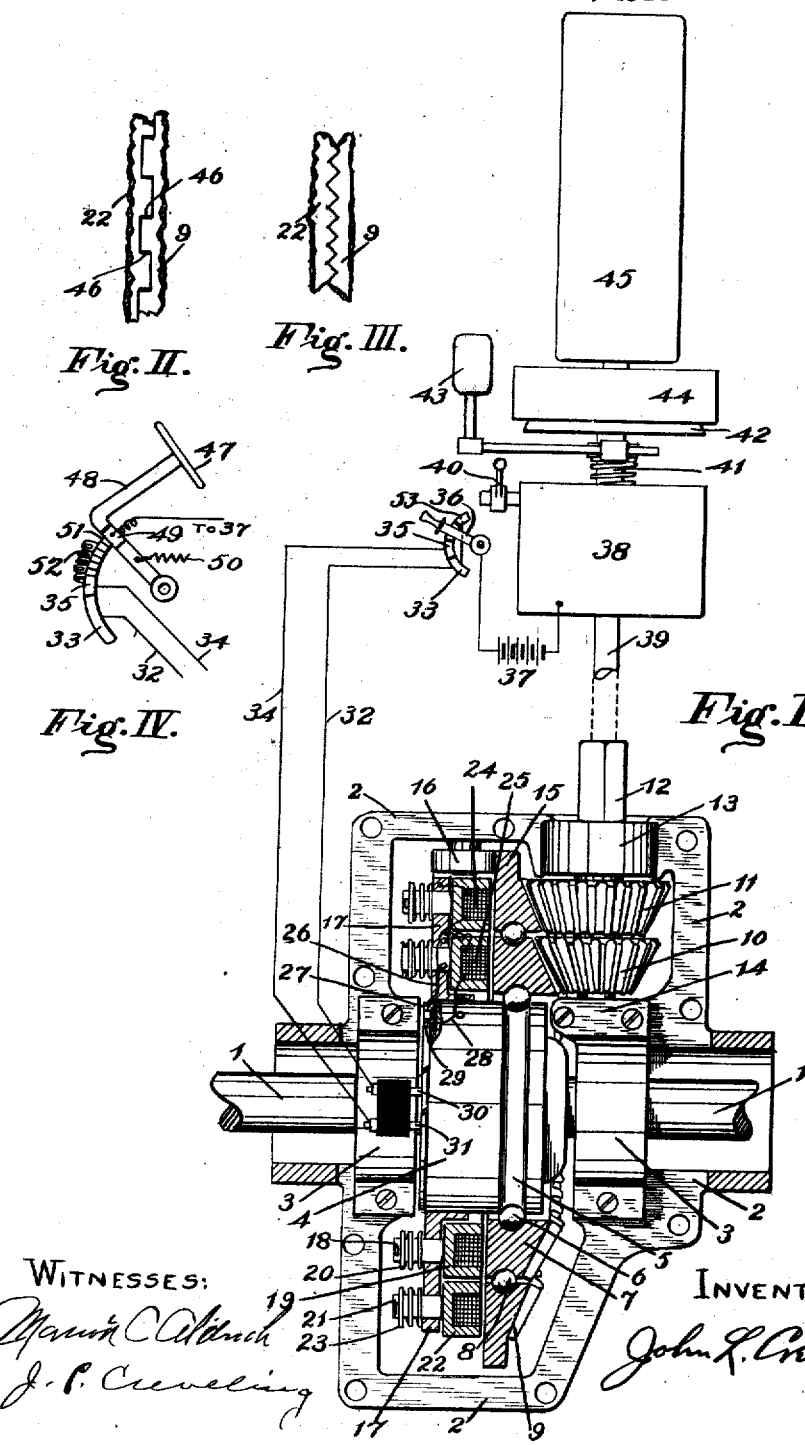
INVENTOR:
John L. Creveling
WITNESSES:

Patented Oct. 16, 1923.

1,470,961

UNITED STATES PATENT OFFICE.

JOHN L. CREVELING, OF AUBURN, NEW YORK.

POWER TRANSMISSION.

Application filed October 26, 1914. Serial No. 868,665.

*To all whom it may concern:*

Be it known that I, JOHN L. CREVELING, a citizen of the United States, residing at Auburn, in the county of Cayuga and State of New York, have invented new and useful Improvements in Power Transmission, set forth in the annexed specification and drawing, forming a part thereof.

My invention pertains to that class of power transmission wherein it is desired to alter the speed ratio between a driving member and a driven member. And, as the same is particularly applicable for use where a motor running at various speeds is desired to have its speed ratio with regard to its load altered, it will be described with reference to such a system and, as such systems are particularly applicable to automobiles, my invention will be described in this connection.

In the drawing, Figure I is a top plan and partial section of one type of transmission mechanism comprehending my invention, diagrammatically represented as connected with the ordinary motor and power mechanism used in gasoline automobiles.

Figure II is a plan of a portion of the apparatus shown in Figure I, with a modification incorporated therein.

Figure III shows a similar portion, embodying a slightly different modification than Figure II.

Figure IV is a diagrammatic representation of a controlling means which may be substituted for that controlling means shown in Figure I.

In Figure I, 1 indicates portions of the driving axles commonly employed in automobiles and independently supported by suitable bearing members held in place within the shell or housing 2, as by suitable caps 3, and united by the usual differential mechanism within the usual housing 4, which is provided in this instance with a ball race 5, in which are free to travel the balls 6, engaging the annular bevel gear 7, the outer periphery of which is provided with a ball race in which travel the balls 8, engaging the annular gear 9, as indicated. The gear 7 engages the pinion 10, while the gear 9 engages the pinion 11, both of said pinions being fixed upon a stud or shaft indicated at 12, and carried within a suitable bearing 13, and a similar bearing held in place by the cap 3, as at 14. The gear 9 may be provided with the flange 15, if desired, rotating against the sheave or roller 16 in such manner as to take the thrust of the pinions against the gears.

17 is an annular flange provided with a shoulder, as indicated, and rigidly attached to the differential shell 4. Perforations in the said flange 17 engage the studs 18 which carry the annular magnet shell 19 of substantially U section, as shown, and which is preferably made of steel having high magnetic permeability and low retentivity and normally drawn in the position shown in the drawing, as by the springs 20. A similar series of studs 21 engage perforations in the flange 17 and carry a similar concentric magnet shell, indicated at 22, which is drawn into the position shown in the drawing by springs 23.

The magnet shell 22 is provided with an annular winding 24, while the shell 19 is provided with a similar winding 25. Both of the said windings have one terminal grounded as indicated, while the remaining terminal of the winding 24 is connected as by wire 26 with the slip ring 27 carried by the shell 4 and insulated therefrom, as indicated. The free terminal of the winding 25 is carried as by the wire 28 to the inner slip ring 29, as shown.

30 is a brush, or other suitable contact member, causing electrical communication with the inner contact ring 29, while 31 is a similar brush causing contact with the outer contact ring 27. The brush 30 is connected as by wire 32 with the segment 33 and may also be connected, if desired, with the segment 53, as indicated. The brush 31 is connected as by wire 34 with the segment 35, the said segments being insulated from each other and so disposed that contact therewith may be made, when desired, by means of lever 36, indicated in the drawing as upon a blank or dead segment. The said lever 36 is connected with one side of the battery 37, the other side of which is grounded, as shown in connection with the transmission gear case 38, which may contain any of the suitable transmission gears now used in practice in automobiles, if desired, the said gears being connected as by shaft 39 with the shaft 12, as indicated by dotted lines, through which connection the pinions 10 and 11 are revolved.

The gears within the case 38, which form no part of my present invention, may be manipulated, as is usual, by means of a lever 40, and are connected, as is the usual practice, as by shaft 41, with the clutch member 42, operated as by pedal 43 to engage the fly wheel 44, of any suitable type of motor indicated at 45. If desired, the opposing faces of the magnet shell 22 and gear 9 may be plain faces so that when forced together against the action of springs 23 there will be a mere frictional contact between the same, or the faces may be provided with engaging clutch members, as indicated in a small portion of said faces shown in plan in Figure II. And when using this modification the faces may be provided with thin strips of non-magnetic material, as indicated at 46, so that when drawn together by magnetization they will not tend to "freeze." Or, if desired, the faces of these two members may be provided with "saw-teeth", as indicated in Figure III. Or any such form of positively engaging means may be employed in place of the frictional engaging means shown in Figure I.

And it will be obvious that both members 19 and 22 may be provided with similar faces, and their respective gears provided with proper faces to engage the same.

In that modification shown in Figure IV the segment 53, together with the lever 36 of Figure I, are suppressed, and the foot pedal 47, provided with the lever 48 and the insulated section 49, normally drawn into the position shown in the drawing as by spring 50, is substituted in place of the lever 36; while the segment 35 is shown as provided with a series of segments united by resistance members 52 in such manner that downward pressure upon the pedal 47 causes the member 49 to move from the blank segment 51 to establish connection with 35 through a resistance which may be decreased by further pressing downwardly upon the pedal 47 until the said resistance is entirely cut out and the segment 35 engaged. Then, further pressure will cause the segment 35 to be cut out, and segment 33 engaged.

An operation of my invention is substantially as follows:

Referring to Figure I, if the engine 45 and other parts of the apparatus indicated in said figure be at rest and the lever 36 in the position indicated in the drawing, there will be no operative connection between the engine 45 and the axles 1, inasmuch as the gears 7 and 9 are free to revolve upon the balls 6 and 8.

However, if the lever 36 be moved onto the segment 35, current will flow from the battery 37 through the lever, segment 35 and wire 34 to contact 31 in communication with ring 27, from which current will flow through wire 26 and winding 24 to the grounded connection, as indicated, from which return is made through the various parts of the mechanical devices in electrical communication with each other, to the negative side of the battery 37, grounded, as indicated, with 38.

This current will energize the winding 24 and cause the annular electromagnet to be drawn, against the tendency of springs 23, into close engaging contact with the gear 9, and thus operatively connect the said gear with the member 17 and the differential shell 4, through the internal members of which the said shell is connected mechanically with the axles 1, in the usual manner.

Therefore, if the engine 45 be started, and the usual gears within the case 38 be so meshed as to engage the shaft 39, the shaft 12 will be revolved, causing pinions 10 and 11 to revolve and rotate the gears 7 and 9; and, as the gear 9 is now engaged, as outlined above, the member 17 will be revolved, and also the shell 4 and axles 1, in connection therewith.

Of course, it will be preferable, in starting the engine 45, to do so when the gears within the housing 38 are not in mesh, so that the engine will run idle, and then depress the pedal 43 so as to break the connection between the engine and the clutch 42 before meshing the gears within 38 by means of lever 40, as is usual. And, the gears having thus been meshed, the load may be thrown gradually upon the engine, in the usual manner, through the instrumentality of clutch 42.

If now with the engine rotating the axle 1 as above described, it be desired to change the speed ratio between the engine and the said axles, the lever 36 may be moved onto the segment 33, and then current will flow from the battery 37, through lever 36, segment 33, wire 32, brush 30, inner ring 29 and wire 28, through winding 25, within the magnet shell 19, to ground, and return through the machine to battery 37. This will energize the winding 25 and cause the electromagnet 25—19 to move into operative contact with the gear 7 so as to operatively connect the said gear with the shell 4 through the instrumentality of member 17, and the axles 1 will now be driven by pinion 10 and gear 7, instead of pinion 11 and gear 9, as above described, inasmuch as this latter gear may now run freely upon the balls 8, since the frictional contact between the said gear and the electromagnet 22—24 will be broken when the current is broken at the segment 35, by movement of the lever 36 from the said segment 35 to the segment 33.

It is, of course, obvious that under many conditions it may be preferable to break the mechanical connection with the engine, through the instrumentality of pedal 43 and clutch 42, while shifting the load from one gear to the other. However, at times, this may be unnecessary and undesired.

If now it be desired to break the operative connection between the gear 7 and the axles, the lever 36 may be moved back into the position shown in the drawing, and then both electromagnets will be de-energized and in the positions shown in the drawing, and both gears 7 and 9 may run free.

If now it be desired to engage the gear 7 without first engaging the gear 9, the lever 36 may be moved over onto the segment 53, which is electrically connected with the segment 33, and the operation will be the same as noted above when the lever 36 was in contact with the said segment 33,—or the lever 36 may be made somewhat elastic, if desired, and in that event it may be lifted free of the segments and placed at any time upon a desired segment, without causing contact with any intervening segment while making the selection.

It will be obvious that, in place of the frictional contacts between the electromagnet shells or shoes 19 and 22 with their respective gears 7 and 9, I may provide the said shells and the said gears with engaging members, as indicated in Figure II, so that while engaged the gears will be positively locked with the engaging magnet shells.

And it will be obvious that I may provide the faces of the said clutch members with non-magnetic strips or liners, indicated at 46, so as to cause in magnetic effect an air gap, to prevent the shells and the gears from freezing, and cause them to be properly drawn into engagement, as shown in Figure II, when energized.

Further, it will be obvious that, if desired, the said shoes or magnet shells and the said gears may have their abutting surfaces provided with saw-teeth, as indicated in Figure III, or any type of engaging surfaces that may be desired for positive, rather than frictional, engagement.

And it will be obvious that, when any of the said positive engaging means is used, it will be preferable always, when shifting connections, to depress the pedal 43 and break the mechanical connection between the engine 45 and the driving mechanism.

However, when using my invention upon light cars wherein the frictional engagement is particularly applicable, the clutch 42, operated by pedal 43, may be suppressed, and also the lever 36 may be suppressed, and that arrangement shown in Figure IV utilized. With this arrangement in the position indicated in the said Figure IV there will be no engagement between the electromagnets and their respective gears, as the circuit will be broken at the blank segment 51.

However, if the engine 45 be running, the pinions 11 and 10 will be revolving, and rotating their respective gears 9 and 7. And if the pedal 47 be slightly depressed, the electromagnet 24—22 will be energized by current flowing in the same manner as above described when the lever 36 was moved to engage segment 35, except that the resistance 52 will be in series therewith and the magnet therefore weakened and the frictional contact between the gear 9 and the shell 22 weakened so that the load may be gradually picked up and the resistance may be lessened, and thus the magnet and its frictional contact strengthened by further depressing the pedal 47 until the said resistance 52 is cut out and the connection made through segment 35, as previously described.

Then if it be desired to alter the speed ratio as before described, further depression of the pedal 47 will cause the circuit to be broken at the segment 35, and made through segment 33, cutting out the magnet 24—22 and energizing the magnet 25—19 in its stead, and thus disconnecting the gear 9 from the axles 1 and connecting the gear 7 in its stead.

From the foregoing, it will be obvious that I have provided a simple and effective means whereby the speed ratio between a driving member and a driven member may be readily changed by electromagnetic means which may be controlled at a convenient point as far distant as desired from the point where the actual mechanical change in ratio is made, and that the operation may be at all times within easy control of an operator.

I do not wish in any way to limit myself to the exact construction nor to the exact mode of operation above given merely to illustrate an embodiment of my invention, for it will be obvious that considerable and wide changes in apparatus may be made without departing from the spirit and scope of my invention, which is as set forth in the following claims:

1. The combination with driving means and means to be driven thereby, of means for operatively connecting the driving and driven means comprehending a plurality of pinions, a plurality of concentric gears engaged thereby, and electromagnetic means in power transmitting relation to the driven means and constituting means for causing the engagement of said gears with the driven means.

2. The combination with a motor provided with a shaft, and a shaft at an angle thereto, of intervening power transmitting means for operatively connecting said shafts comprising a plurality of concentric gears and pinions for said gears and electromagnetic driving means whereby said gears operatively unite said shafts.

3. The combination with a motor having a shaft and a shaft to be driven thereby, of means for operatively connecting said shafts comprehending a plurality of concentric gears about the driven shaft, means for engaging the same with the driving shaft, and electromagnetic means for engaging said concentric gears and forming a connection thereof with the driven shaft.

4. The combination with a motor having a shaft and a shaft to be driven thereby, of means for operatively connecting said shafts comprehending a plurality of concentric gears about the driven shaft, means for engaging the same with the driving shaft, and electromagnetic manually controlled means the rotation of which rotates the driven shaft for engaging said concentric gears.

5. The combination with a motor having a shaft and a shaft to be driven thereby, of means for operatively connecting said shafts comprehending a plurality of concentric gears about the driven shaft, means for engaging the same with the driving shaft, and means for singly and selectively engaging said concentric gears and causing operative connection thereof with the driven shaft comprehending power transmitting electromagnetic engaging means.

6. The combination with a motor having a shaft, and a shaft to be driven thereby, of means for operatively connecting said shafts comprehending a plurality of concentric gears about the driven shaft, means for engaging the same with the driving shaft, and means for singly engaging each of said concentric gears and operatively uniting the same with the driven shaft comprehending concentric electromagnetic engaging means in power transmitting relation to the driven shaft for each of said gears.

7. The combination with a motor having a driving shaft and a shaft to be driven thereby, of means for operatively connecting said shafts comprehending a plurality of concentric gears surrounding the driven shaft, a plurality of concentric magnetic clutches surrounding the driven shaft and connected to revolve therewith, each of said clutches registering with one of said concentric gears and adapted when energized to cause a power transmitting connection therewith, and when deenergized to be freely movable with respect thereto, and means for selectively energizing said clutches.

JOHN L. CREVELING.

Witnesses:
MARY MONTAGUE,
J. P. CREVELING.